US008817612B2

(12) United States Patent
Zhou et al.

(10) Patent No.: US 8,817,612 B2
(45) Date of Patent: Aug. 26, 2014

(54) METHOD FOR IMPLEMENTING LIMITED POLICY AND CHARGING CONTROL AND SYSTEM THEREOF

(75) Inventors: Xiaoyun Zhou, Shenzhen (CN); Zaifeng Zong, Shenzhen (CN)

(73) Assignee: ZTE Corporation (CN)

( * ) Notice: Subject to any disclaimer, the term of this patent is extended or adjusted under 35 U.S.C. 154(b) by 324 days.

(21) Appl. No.: 13/259,957

(22) PCT Filed: Sep. 9, 2009

(86) PCT No.: PCT/CN2009/073835
§ 371 (c)(1),
(2), (4) Date: Sep. 23, 2011

(87) PCT Pub. No.: WO2010/121460
PCT Pub. Date: Oct. 28, 2010

(65) Prior Publication Data
US 2012/0020345 A1    Jan. 26, 2012

(30) Foreign Application Priority Data

Apr. 20, 2009  (CN) .......................... 2009 1 0134979

(51) Int. Cl.
*H04L 12/26*  (2006.01)
*H04W 40/00*  (2009.01)
*H04W 36/12*  (2009.01)
*H04W 36/24*  (2009.01)

(52) U.S. Cl.
USPC ........... 370/230; 370/252; 370/331; 370/338; 370/401; 370/432.1; 370/433; 370/436; 370/414.2

(58) Field of Classification Search
USPC ......... 370/252, 254–255, 328, 329–330, 331, 370/338, 352–356; 455/450
See application file for complete search history.

(56) References Cited

U.S. PATENT DOCUMENTS 8,355,325 B2 *   1/2013   Huang et al. .................. 370/230
8,489,096 B2 *   7/2013   Rasanen ....................... 455/436
(Continued)

FOREIGN PATENT DOCUMENTS

CN          101047874         10/2007

OTHER PUBLICATIONS

International Search Report for PCT/CN2009/073835, International Searching Authority—China, Jan. 18, 2010, Beijing, China, 3 Pages.
Temporary Document, TD S2-087553, 3GPP TSG SA WG2, Correction to the limited PCC deployment detection, Meeting #69, Nov. 17, 2008, Miami, FL, USA, 4 pages.

(Continued)

*Primary Examiner* — Candal Elpenord
(74) *Attorney, Agent, or Firm* — Marger Johnson & McCollom, P.C.

(57) ABSTRACT

The present invention provides a method and system for implementing limited policy and charging control. The method comprises a PCRF determining whether a visited network where a UE roams supports PCC, and sending a message containing an identifier indicating the limited policy and charging control deployment to an AF. After receiving the message containing the identifier, the AF performs no subscription of the event trigger and/or cancels the subscription of the event trigger based on the identifier. Using the method and system in accordance with the present invention, the AF can be notified more conveniently and accurately of the current policy and charging control deployment situation when the limited policy and charging control is implemented (i.e., when the visited network does not support the PCC). Moreover, the AF may perform the corresponding operations according to the current policy and charging control deployment situation, thereby saving system resources.

19 Claims, 7 Drawing Sheets

(56) References Cited

U.S. PATENT DOCUMENTS

| | | | |
|---|---|---|---|
| 8,521,775 B1* | 8/2013 | Poh et al. | 707/781 |
| 2006/0250956 A1* | 11/2006 | Alfano et al. | 370/230 |
| 2007/0066286 A1* | 3/2007 | Hurtta | 455/414.1 |
| 2007/0232301 A1* | 10/2007 | Kueh | 455/433 |
| 2008/0046963 A1* | 2/2008 | Grayson et al. | 726/1 |
| 2008/0229385 A1* | 9/2008 | Feder et al. | 726/1 |
| 2009/0182883 A1* | 7/2009 | Giaretta et al. | 709/228 |
| 2009/0305684 A1* | 12/2009 | Jones et al. | 455/418 |
| 2010/0150003 A1* | 6/2010 | Andreasen et al. | 370/252 |
| 2010/0154030 A1* | 6/2010 | Montemurro et al. | 726/1 |

OTHER PUBLICATIONS

Change Request, TD S2-087554, 3GPP TSG SA WG2 Meeting #69, Nov. 17-21, 2008, Miami, FL, USA, 4 pages.

Change Request, TD S2-094188, 3GPP TSG SA WG2 Meeting #73, May 11-15, 2009, Tallinn, Estonia, 4 pages.

Change Request, C3-090574, 3GPP TSG-CT WG3 Meeting #52, Apr. 20-24, 2009, Sophia Antipolis, France, 4 pages.

Technical Specification, 3GPP TS 23.203 version 8.5.0 Release 8, "Digital Cellular Telecommunications System (Phase 2+); Universal Mobile Telecommunications Systems—Policy and Charging Control Architecture," Mar. 2009, 116 pages.

* cited by examiner

METHOD FOR IMPLEMENTING LIMITED POLICY AND CHARGING CONTROL AND SYSTEM THEREOF

TECHNICAL FIELD

The present invention relates to a method and system for implementing limited policy and charging control.

TECHNICAL BACKGROUND

As shown in FIG. 1, the 3$^{rd}$ Generation Partnership Project (3GPP) Evolved Packet System (EPS) consists of an Evolved Universal Terrestrial Radio Access Network (E-UTRAN), a Mobility Management Entity (MME), a Serving Gateway (S-GW), a Packet Data Network Gateway (PDN GW or P-GW), a Home Subscriber Server (HSS), a 3GPP Authentication, Authorization and Accounting (AAA) server, a Policy and Charging Rules Function (PCRF) and other supporting nodes.

The MME is used for control plane related work, such as mobility management, processing of non-access layer signaling and management of user mobility management context. The S-GW which is an access gateway device connecting with the E-UTRAN is used to transfer data between the E-UTRAN and the P-GW and cache paging and waiting data. The P-GW which is a border gateway between the EPS and the PDN is used for access of the PDN and transfer of data between the EPS and the PDN.

The EPS supports interworking with a non-3GPP system, which is implemented through S2$a$, S2$b$ and S2$c$ interfaces. The P-GW acts as an anchor point between the 3GPP system and the non-3GPP system. The non-3GPP system is classified as trusted non-3GPP access system and untrusted non-3GPP access system. The trusted non-3GPP access system can be connected to the P-GW directly through the S2$a$ interface; while the untrusted non-3GPP access system is required to be connected to the P-GW through an Evolved Packet Data Gateway (ePDG). Between the ePDG and the P-GW is the S2$b$ interface. The S2$c$ interface offers user plane related control and mobility support between a user equipment (UE) and the P-GW. The supported mobility management protocol is the Mobile IPv6 support for dual stack Hosts and Routers (DSMIPv6).

The EPS system introduces a Policy and Charging Control (PCC) function framework for dynamically controlling policy and charging of service access of users. Each logic function entity and its interface function in a Rel-8 PCC non-roaming scene architecture shown in FIG. 2 will be described below An Application Function (AF) is used to offer access points for service applications. Network resources used by these service applications need dynamic policy control. When parameters negotiation at a service plane is implemented, the AF transfers the related service information to the Policy and Charging Rules Function (PCRF). If the service information is consistent with the policy of the PCRF, the PCRF will accept the negotiation; otherwise, the PCRF rejects the negotiation and gives its acceptable parameters upon feedback. Afterwards, the AF may return these parameters to the user equipment (UE). Between the AF and the PCRF is an Rx interface.

The PCRF is the core of the PCC and is responsible for making policy decision and charging rules. The PCRF offers service data flow based network control rules, which comprise detection of the service data flow, gating control, QoS (Quality of Service) control and data flow based charging rules. The PCRF sends its constituted policy and charging rules to a Policy and Control Enforcement Function (PCEF) for enforcement; meanwhile, the PCRF also needs to guarantee the consistency of these rules and user subscription information. The basis for the PCRF to constitute the policy and charging rules is to obtain service related information from the AF, acquire the subscription information associated with user policy and charging control from a Subscription Profile Repository (SPR), and acquire information of bearing related network from the PCEF through a Gx interface.

The PCEF is usually located in a gateway (GW) and executes the policy and charging rules made by the PCRF at a bearing plane. The PCEF detects service data flows according to a service data flow filter in the rules sent by the PCRF, and further executes the policy and charging rules made by the PCRF for the service data flows. When a bearer is established, the PCEF performs QoS authorization according to the rules sent by the PCRF and performs the gateway control according to the AF's enforcement. Meanwhile, the PCEF triggers and reports events occurring in the bearing network according to events subscribed by the PCRF. According to the charging rules sent by the PCRF, the PCEF performs a corresponding service data flow charging operation, which may be online charging or offline charging. If it is the online charging, the PCEF needs to manage credit together with an online charging system (OCS). When it is the offline charging, the PCEF exchanges the related charging information with an offline charging system (OFCS). An interface between the PCEF and the PCRF is a Gx interface, an interface between the PCEF and the OCS is a Gy interface, and an interface between the PCEF and the OFCS is a Gz interface. The PCEF is generally located in a network gateway, such as a Packet Data Network Gateway (PDN-GW) of the EPS, a General Packet Radio Service (GPRS) Gateway Supporting Node (GGSN) in the GPRS and a Packet Data Gateway (PDG) in an Interworking WLAN (I-WLAN).

A Bearer Binding and Event Reporting Function (BBERF) is generally located in an access network gateway. For example, when the UE accesses the EPS through the E-UTRAN using the Proxy Mobile Internet Protocol version 6 (PMIPv6) between the S-GW and the P-GW, the BBERF exists in the S-GW. When the UE accesses the EPS through the trusted non-3GPP access network, the BBERF also exists in the trusted non-3GPP access gateway. The objective of introducing the BBERF is that when the Mobile Internet Protocol (MIP) is used between the access network gateway and the P-GW, the PCEF cannot establish, modify and delete the bearer according to the PCC rules, meanwhile, it possibly cannot report the triggered events. At this point, the establishment, modification and deletion of the bearer as well as the event reporting function are performed by the BBERF. The PCRF interacts with the BBERF through a Gxx interface.

The subscription profile repository (SPR) stores the subscription information associated with policy and charging control of users. Between the SPR and the PCRF is a Sp interface.

The online charging system (OCS) controls and manages the user's credit in an online charging mode together with the PCFF.

The offline charging system (OFCS) performs a charging operation in an offline charging mode together with the PCFF.

The AF is required to subscribe an AF signaling transmission path state notification at the PCRF. After the PCRF receives the AF's subscription, it subscribes the corresponding event trigger at the PCEF. When the PCEF detects the corresponding event (e.g., lose or release of the bearer for transmitting the AF signaling), it reports the lose or release of the bearer for transmitting the AF signaling to the PCRF, which, in turn, notifies the AF of the event (or referred to as state).

When the user equipment accesses the EPS through the E-UTRAN using the PMIPv6 between the S-GW and the P-GW, or when the user equipment accesses the EPS through the trusted non-3GPP access network using the PMIPv6 between the trusted non-3GPP access network and the P-GW, or when the user equipment accessed the EPS through the trusted non-3GPP access network using the DSMIPv6 (Dual Stack Mobile Internet Protocol version 6) or MIPv4, the PCEF located in the P-GW cannot detect the loss or release of the bearer for transmitting the AF signaling. At this point the PCRF can only subscribe the loss and release of the bearer for transmitting the AF signaling event trigger at the BBERF, which detects and reports this event to the PCRF, which, in turn, reports this event to the AF.

In addition, the AF may also subscribe an IP-Connectivity Access Network (IP-CAN) type change notification at the PCRF. After the PCRF receives the AF's subscription, it subscribes the event trigger at the BBERF, which detects and reports the event to the PCRF. The BBERF reports the IP-CAN type as well as the specific radio access technology (RAT) type change in the IP-CAN type to the PCRF, which, in turn, reports this information to the AF.

Likewise, when the user equipment accesses the EPS through the E-UTRAN using the PMIPv6 between the S-GW and the P-GW, or when the user equipment accesses the EPS through the trusted non-3GPP access network using the PMIPv6 between the trusted non-3GPP access network and the P-GW, or when the user equipment accesses the EPS through the trusted non-3GPP access network using the DSMIPv6 or MIPv4, the PCEF located in the P-GW cannot accurately detect the change of the RAT type in the IP-CAN type in certain cases. At this point, the PCRF can only subscribe the IP-CAN type change notification at the BBERF, which detects and reports the event to the PCRF, which, in turn, reports the event to the AF.

In addition, when the user equipment accesses the EPS in the access scene described above and the AF requests resources for specific services, the AF may also subscribe a notification on whether the resources requested for the services are assigned successfully from the PCRF. After the PCRF receives the AF's subscription, it subscribes the event trigger at the BBERF. Upon the successful or unsuccessful assignment, the BBERF reports a successful or unsuccessful event to the PCRF, which, in turn, reports the event to the AF.

However, in a roaming scene where the UE is in home routing, that is, the P-GW is located in a home network and the S-GW or the trusted non-3GPP access network gateway is located in a visited network, if the PCC is deployed in the home network and the PCC is not deployed in the visited network, because the visited network cannot report the subscribed event to the PCRF, the PCRF cannot report the event to the AF either.

Likewise, when the UE accesses the EPS through the non-3GPP access network and the non-3GPP access network and the 3GPP network belong to different operators, if the PCC is deployed in the 3GPP network and the PCC is not deployed in the non-3GPP network, because the non-3GPP network cannot report the subscribed event to the PCRF, the PCRF cannot report the event to the AF either.

In the prior art, the AF determines whether the PCC is deployed in the visited network in which the UE is located based on its own configuration information (e.g., roaming protocol), that is, it determines whether the current scene is the limited PCC deployment scene. When the visited network does not support the PCC, the AF will not subscribe certain events (e.g., the AF signaling transmission path state notification, the IP-CAN type change notification and the resource assignment request successful or unsuccessful notification) at the PCRF. The main problem with this method is that the configuration information is relatively complicated, especially when the AF is a third party offering services; the configuration information is difficult to be updated; and when the visited network, or some S-GWs in the non-3GPP network, or the trusted non-3GPP access gateway support the BBERF, the AF cannot simply decide whether to subscribe the events according to the visited network in which the UE is located.

Content of the Invention

A technical problem to be solved by the present invention is to overcome shortcomings of the prior art and provide a method and system for implementing limited policy and charging control such that an AF can know more conveniently whether the current deployment is the limited policy and charging control deployment (that is, PCC is not deployed in the visited network and the dynamic PCC is not supported).

In order to solve the problems described above, the present invention provides a method for implementing limited policy and charging control comprising:

a policy and charging rules function (PCRF) determining whether a visited network where a user equipment (UE) roams supports policy and charging control (PCC), and notifying an application function (AF) that the subscribed event cannot be reported if the visited network does not support the PCC.

The PCRF may send a message containing an identifier indicating the limited policy and charging control deployment to the AF.

In addition, after receiving the message containing the identifier from the PCRF, the AF performs no subscription of the event and/or cancels the subscription of the event based on the identifier.

In addition, the PCRF determines whether the visited network supports the PCC by the following manner:

the PCRF determines whether the visited network supports the PCC after receiving an IP-connectivity access network (IP-CAN) session establishment indication message or an IP-CAN session modification indication message; when a mobility protocol type (MPT) identifier contained in the IP-CAN session establishment indication message or IP-CAN session modification indication message indicates that the access does not use a general packet radio service (GPRS) tunneling protocol and the PCRF does not receive a gateway control session establishment indication message, it is determined that the visited network does not support the PCC.

In addition, the PCRF determines whether the visited network supports the PCC by the following manner:

the PCRF determines whether the visited network supports the PCC based on local configuration information as well as an IP address of an access gateway in the visited network and/or a care of address of the UE and/or an IP address of a service gateway.

In addition, the PCRF determines whether the visited network supports the PCC by the following manner:

a policy and control enforcement function (PCEF) determines whether the visited network supports the PCC based on local configuration information as well as an IP address of an access gateway in the visited network and/or a care of address of the UE and/or an IP address of a service gateway and notifies the PCRF of a determination result, and the PCEF determines whether the visited network supports the PCC based on the determination result.

In addition, after receiving an application/service information message or event subscription message sent by the AF, the PCRF puts the identifier indicating the limited policy and charging control deployment into a corresponding response message to send to the AF.

In addition, when the UE switches to an access gateway not supporting a bearer binding and event reporting function (BBERF), the PCRF notifies the AF that the subscribed event cannot be reported.

In addition, when the PCRF detects that the UE moves to a trusted non-3GPP access network supporting the PCC, a visited 3GPP access network or a home network, the PCRF sends a limited policy and charging control deployment recovery indication identifier to the AF.

The present invention also provides a policy and charging rules function (PCRF) which supports implementation of limited policy and charging control and is configured to determine whether a visited network where a user equipment (UE) roams supports policy and charging control (PCC) and notify an application function (AF) that the subscribed event cannot be reported if the visited network does not support the PCC.

In addition, the PCRF is configured to send a message containing an identifier indicating the limited policy and charging control deployment to the AF such that the AF performs no subscription of the event and/or cancels the subscription of the event based on the identifier.

In addition, the PCRF is configured to determine whether the visited network supports the PCC by the following manner:

the PCRF determines whether the visited network supports the PCC after receiving an IP-connectivity access network (IP-CAN) session establishment indication message or an IP-CAN session modification indication message; when a mobility protocol type (MPT) identifier contained in the IP-CAN session establishment indication message or IP-CAN session modification indication message indicates that the access does not use a general packet radio service (GPRS) tunneling protocol and the PCRF does not receive a gateway control session establishment indication message, it is determined that the visited network does not support the PCC.

In addition, the PCRF is configured to determine whether the visited network supports the PCC by the following manner:

the PCRF determines whether the visited network supports the PCC based on local configuration information as well as an IP address of an access gateway in the visited network and/or a care of address of the UE and/or an IP address of a service gateway.

In addition, the PCRF is configured to determine whether the visited network supports the PCC by the following manner:

a policy and control enforcement function (PCEF) determines whether the visited network supports the PCC based on local configuration information as well as an IP address of an access gateway in the visited network and/or a care of address of the UE and/or an IP address of a service gateway and notifies the PCRF of a determination result, and the PCEF determines whether the visited network supports the PCC based on the determination result.

In addition, the PCRF is configured to, after receiving an application/service information message or event subscription message sent by the AF, put the identifier indicating the limited policy and charging control deployment into a corresponding response message to send to the AF.

In addition, the PCRF is further configured to notify the AF that the subscribed event cannot be reported when the UE switches to an access gateway not supporting a bearer binding and event reporting function (BBERF).

In addition, the PCRF is further configured to send a limited policy and charging control deployment recovery indication identifier to the AF when detecting that the UE moves to a trusted non-3GPP access network supporting the PCC, a visited 3GPP access network or a home network.

The present invention also provides a system for implementing limited policy and charging control comprising the policy and charging rules function (PCRF) and application function (AF) described above.

A system for implementing limited policy and charging control in accordance with the present invention may comprise a UE, a PCRF, an AF and a visited network where the UE roams.

The PCRF is configured to determine whether the visited network supports the PCC, and send a message containing an identifier indicating the limited policy and charging control deployment to the AF if the visited network supports the PCC.

In addition, after receiving the message containing the identifier, the AF performs no subscription of the event and/or cancels the subscription of the event based on the identifier.

To sum up, using the method and system in accordance with the present invention, the AF can be notified more conveniently and accurately of the current policy and charging control deployment situation when the limited policy and charging control is implemented (i.e., when the visited network does not support the PCC). Moreover, the AF may perform the corresponding operations, such as inexecution of the subscription of the event or cancellation of the subscription of the event, according to the current policy and charging control deployment situation, thereby saving system resources.

PREFERRED EMBODIMENTS OF THE INVENTION

A method and system in accordance with the present invention will be described in detail in conjunction with the accompanying figures and embodiments below.

The First Embodiment

Figure 1:
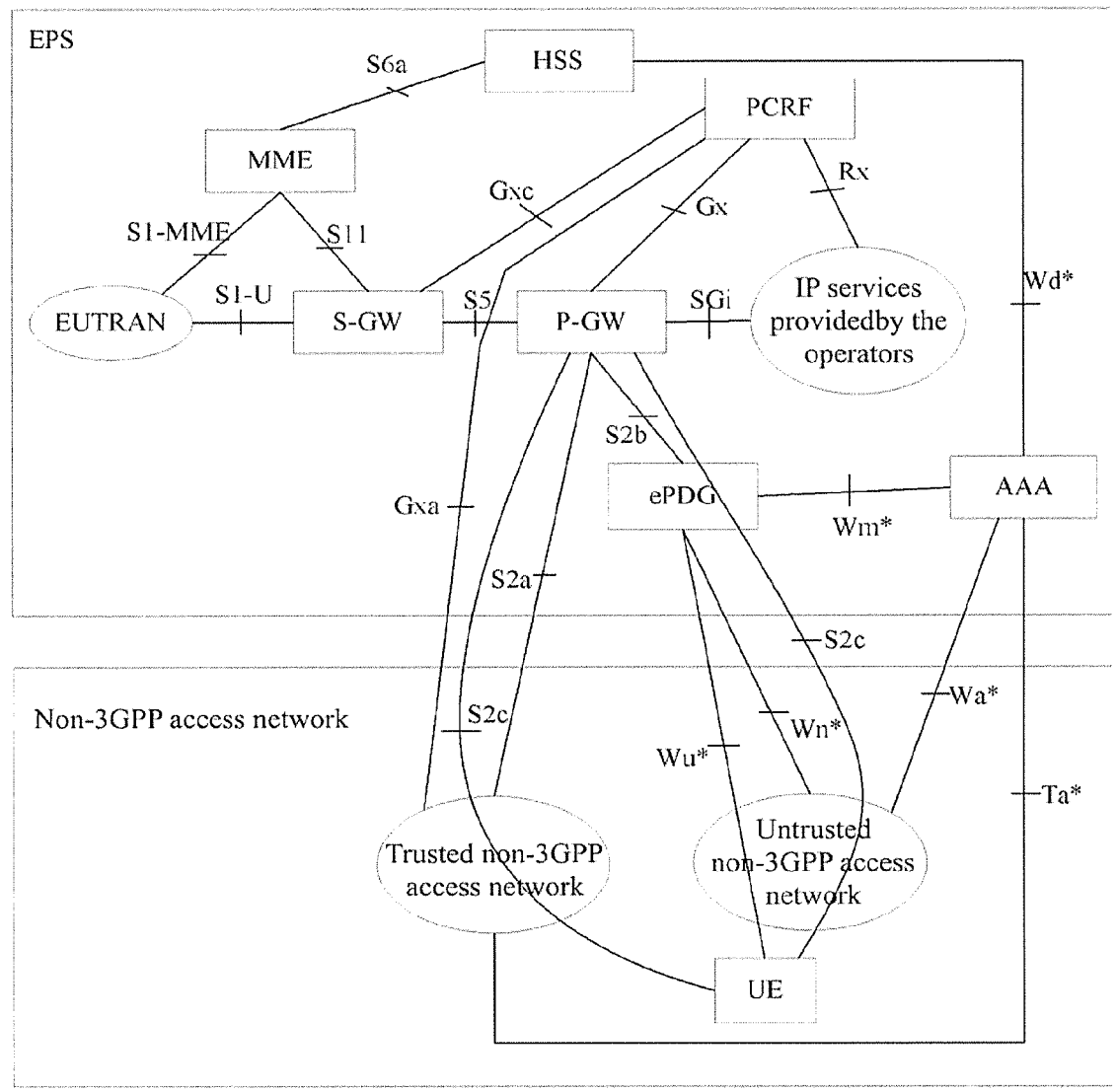
FIG. 1 is a block diagram of the existing EPS.
Figure 2:
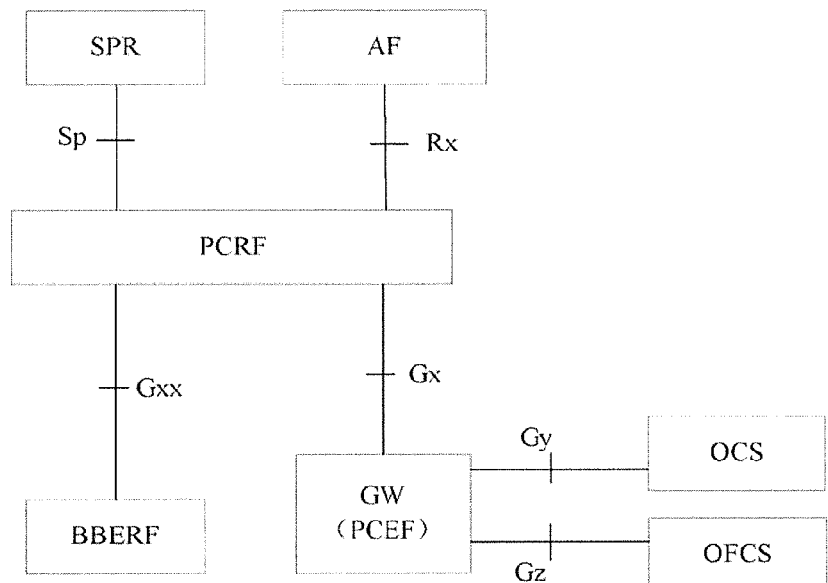
FIG. 2 is a block diagram of the existing Rel-8 PCC non-roaming scene.
Figure 3:
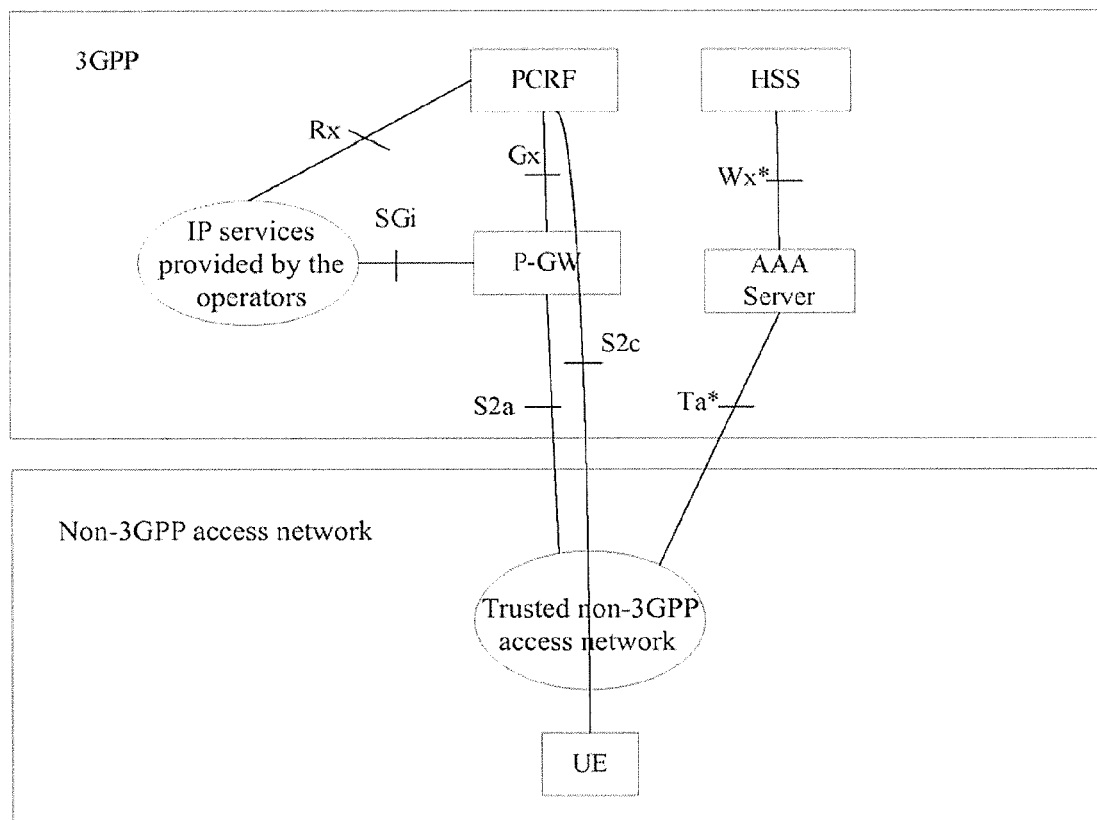
FIG. 3 is a schematic diagram of an application scene of the first and second embodiments of the present invention.

FIG. 3 is a schematic diagram of an application scene of the first and second embodiments of the present invention. In this application scene, a UE accesses an EPS through the trusted non-3GPP access network using the PMIPv6. The 3GPP network supports the dynamic PPC and the trusted non-3GPP does not support the dynamic PPC. The trusted non-3GPP network and 3GPP network belong to different operators.

Figure 4:
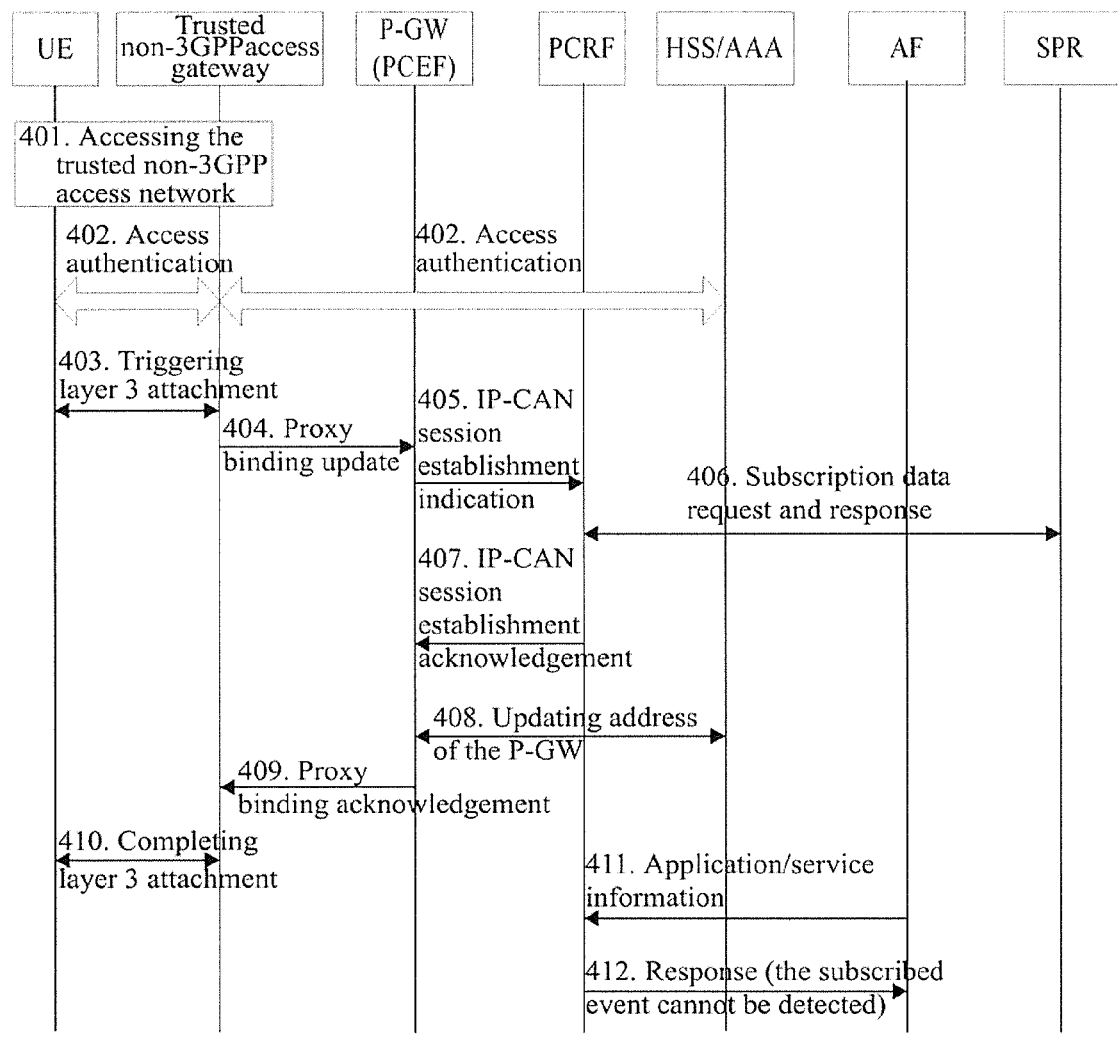
FIG. 4 is a flow chart of a method in accordance with the first embodiment of the present invention.

A flow chart of a method in accordance with the first embodiment of the present invention is shown in FIG. 4 and comprises specifically the following steps:

401: The UE accesses the trusted non-3GPP access network.

402: After the UE accesses the trusted non-3GPP access network, it requests EPS access authentication from a HSS/AAA, which authenticates the UE that sends an EPS access authentication request after receiving the request and sends P-GW selection information subscribed by the UE to the trusted non-3GPP access gateway after completing the authentication of the UE.

403: A layer 3 attachment process of the UE is triggered.

404: The trusted non-3GP access gateway selects a P-GW according to the P-GW selection information and sends an proxy binding update message containing a network access identifier (NAI) of the UE and an access point name (APN) to the selected P-GW.

405: After the P-GW receives the proxy binding update message, it sends an IP-CAN session establishment indication, which contains the NAI of the UE, an IP address assigned by the P-GW for the UE, the APN and a mobility protocol type (MPT) identifier used for indicating the PCRF that the access of the UE uses the PMIPv6, to a PCRF.

The MPT identifier can also notify the PCRF that the current access uses the non-GPRS tunneling protocol (GTP) by not containing a GTP specific parameter. If the message does not contain Default_EPS_Bearer_QoS, the PCRF may determine that the current access does not use the GTP.

406: The PCRF interacts with a SPR to acquire subscription data associated with access services of users.

407: Because the MPT indicates that the current access uses the PMIPv6 or other non-GTP, and the PCRF does not receive a gateway control session establishment indication message sent by the trusted non-3GPP access gateway, the PCRF determines that the trusted non-3GPP access gateway does not support the dynamic PCC. In order to guarantee that the policy controls of the trusted non-3GPP access network and the P-GW are consistent and the UE can be charged correctly, the PCRF decides not to start the dynamic PCC. The PCRF puts an indication that the dynamic PCC is not started into an IP-CAN session establishment acknowledgement message returned to the P-GW; or the PCRF can customize some special dynamic PCC rules for this specific scene (that is, the limited policy and charging control deployment scene), and these special dynamic PCC rules, however, must guarantee that the UE can be charged correctly.

408: The P-GW interacts with the HSS and sends its own IP address to the HSS.

409: After the P-GW receives the indication that the dynamic PCC is not stated, it uses preconfigured policy and charging rules or installs the special dynamitic PCC rules customized by the PCRF for this special scene; and the P-GW returns an proxy binding acknowledgement message to the trusted non-3GPP access gateway.

410: The layer 3 attachment process is completed.

411: The UE interacts with an AF, and after parameters, such as QoS, are negotiated for the access services, the AF sends an application/service information message to the PCRF to provide service information required for the access services.

412: The PCRF saves the service information and returns a response message containing an indication that a bearer layer event cannot be detected. The message may also contain a specific reason that the bearer layer event cannot be detected, that is, the non-3GPP network does not support the dynamic PPC (the current scene is the limited policy and charging control deployment scene), and the value of the reason may be called as a limited policy and charging control deployment indication identifier. After the AF receives the response message, it does not subscribe an AF signaling transmission path state notification, an IP-CAN type change notification and/or a resource assignment request successful or unsuccessful notification.

In addition, if the AF subscribes the AF signaling transmission path state notification, the IP-CAN type change notification and/or the resource assignment request successful or unsuccessful notification from the PCRF in step 411, the response message containing the indication that the bearer layer event cannot be detected is returned in step 412 and may contain the specific reason that the bearer layer event cannot be detected, and the AF cancels the subscription after receiving the message.

The PCRF can also determine that the trusted non-3GPP network does not support the dynamic PCC using other methods. For example, the PCEF firstly determines that the trusted non-3GPP access gateway does not support the dynamic PCC according to the IP address of the trusted non-3GPP access gateway and configuration information of the PCEF (which records IP addresses that correspond to the trusted non-3GPP access gateways supporting and/or not supporting the dynamic PCC) contained in the proxy binding update message such that the PCEF reports to the PCRF (e.g., by the IP-CAN session establishment indication message) that the trusted non-3GPP access gateway does not support the dynamic PCC.

If the UE moves to a trusted non-3GPP access network supporting the dynamic PCC or a visited 3GPP access network or returns to its home network after the access through the embodiments described above, the PCRF detects that the trusted non-3GPP network supports the dynamic PCC and sends a limited policy and charging deployment recovery indication (which is used for indicating that the current policy and charging deployment has been recovered from the limited policy and charging deployment to the normal policy and charging deployment) to the AF to notify the AF to subscribe the AF signaling transmission path state notification, the IP-CAN type change notification and/or the resource assignment request successful or unsuccessful notification. Afterwards, the AF can subscribe the bearer layer event again.

In the case that the UE accesses the EPS using the MIPv4 through the trusted non-3GPP access network, the 3GPP network supports the dynamic PCC and the trusted non-3GPP access network does not support the dynamic PCC, and the trusted non-3GPP access network and the 3GPP network belong to different operators, the process where the AF knows the limited policy and charging control deployment is similar to the method in accordance with this embodiment and will not be repeated herein.

The Second Embodiment

Figure 5:
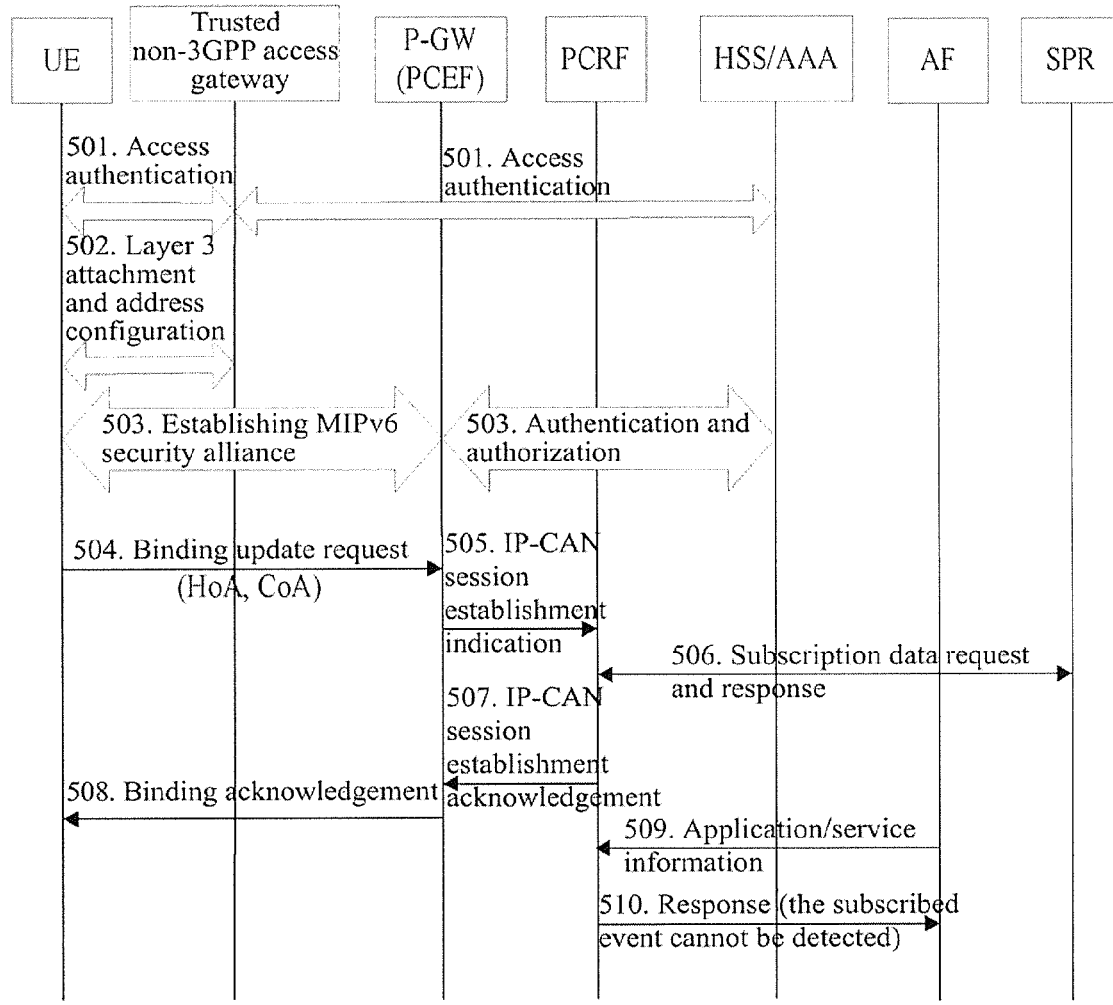
FIG. 5 is a flow chart of a method in accordance with the second embodiment of the present invention.

In this embodiment, in the application scene shown in FIG. 3, a UE accesses the EPS using the DSMIPv6 through the trusted non-3GPP access network, the 3GPP network supports the dynamic PCC and the trusted non-3GPP does not support the dynamic PCC (the trusted non-3GPP access network and the 3GPP network belong to different operators). A flow chart of a method in accordance with the second embodiment of the present invention is shown in FIG. 5 and comprises specifically the following steps:

501: The UE accesses the trusted non-3GPP access network, a HSS/AAA and the UE authenticate with each other, and then the HSS/AAA authorizes the UE.

502: Upon successful authorization, the UE negotiates with the trusted non-3GPP access gateway, decides to access it using the DSMIPv6, and performs a layer 3 attachment process; and the trusted non-3GPP access gateway assigns a CoA (care of address) to the UE.

503: The UE searches a domain name system (DNS) according to an APN to acquire an IP address of a P-GW to be accessed, which is located in a home network of the UE, and the UE establishes a security alliance with the P-GW so as to acquire a home address (HoA).

504: After the UE establishes the security alliance with the P-GW, it sends a binding update request message containing the HoA and the CoA to the P-GW.

505: After the P-GW receives the proxy binding update message, it sends an IP-CAN session establishment indication, which contains the NAI of the UE, an IP address assigned by the P-GW for the UE, the APN and a MPT identifier used for indicating that the access of the UE uses the PMIPv6, to a PCRF.

The MPT identifier can also notify the PCRF that the current access uses the non-GPRS tunneling protocol (GTP) by not containing a GTP specific parameter. If the message does not contain Default_EPS_Bearer_QoS, the PCRF may determine that the current access does not use the GTP.

506: The PCRF interacts with a SPR to acquire subscription data associated with access services of users.

507: Because the MPT indicates that the current access uses the PMIPv6 or other non-GTP, and the PCRF does not receive a gateway control session establishment indication message sent by the trusted non-3GPP access gateway, the PCRF determines that the trusted non-3GPP access gateway does not support the dynamic PCC. In order to guarantee that the policy controls of the trusted non-3GPP access network and the P-GW are consistent and the UE can be charged correctly, the PCRF decides not to start the dynamic PCC. The PCRF puts an indication that the dynamic PCC is not started into an IP-CAN session establishment acknowledgement message returned to the P-GW; or the PCRF can customize some special dynamic PCC rules for this specific scene, and these special dynamic PCC rules, however, must guarantee that the UE can be charged correctly.

508: After the P-GW receives the indication that the dynamic PCC is not stated, it uses preconfigured policy and charging rules or installs the special dynamitic PCC rules customized by the PCRF for this special scene; and the P-GW returns an proxy binding acknowledgement message to the trusted non-3GPP access gateway.

509: The UE interacts with an AF, and after parameters, such as QoS, are negotiated for the access services, the AF sends an application/service information message to the PCRF to provide service information required for the access services.

510: The PCRF saves the service information and returns a response message containing an indication that a bearer layer event cannot be detected. The message may also contain a specific reason that the bearer layer event cannot be detected, that is, the non-3GPP network does not support the dynamic PPC (the current scene is the limited policy and charging control deployment scene), and the value of the reason may be called as a limited policy and charging control deployment indication identifier. After the AF receives the response message, it does not subscribe an AF signaling transmission path state notification, an IP-CAN type change notification and/or a resource assignment request successful or unsuccessful notification.

In addition, if the AF subscribes the AF signaling transmission path state notification, the IP-CAN type change notification and/or the resource assignment request successful or unsuccessful notification from the PCRF in step 509, the response message containing the indication that the bearer layer event cannot be detected is returned in step 510 and may contain the specific reason that the bearer layer event cannot be detected, and the AF cancels the subscription after receiving the message.

The PCRF can also determine that the trusted non-3GPP network does not support the dynamic PCC using other methods. For example, the PCEF firstly determines that the trusted non-3GPP access gateway does not support the dynamic PCC according to the care of address (CoA) and configuration information of the PCEF (which records IP addresses that correspond to the trusted non-3GPP access gateways supporting and/or not supporting the dynamic PCC) contained in the proxy binding update message such that the PCEF reports to the PCRF that the trusted non-3GPP access gateway does not support the dynamic PCC.

If the UE moves to a trusted non-3GPP access network supporting the dynamic PCC or a visited 3GPP access network or returns to its home network after the access through the embodiments described above, the PCRF detects that the trusted non-3GPP network supports the dynamic PCC and sends a limited policy and charging deployment recovery indication (which is used for indicating that the current policy and charging deployment has been recovered from the limited policy and charging deployment to the normal policy and charging deployment) to the AF to notify the AF to subscribe the AF signaling transmission path state notification, the IP-CAN type change notification and/or the resource assignment request successful or unsuccessful notification. Afterwards, the AF can subscribe the bearer layer event again.

The Third Embodiment

Figure 6:
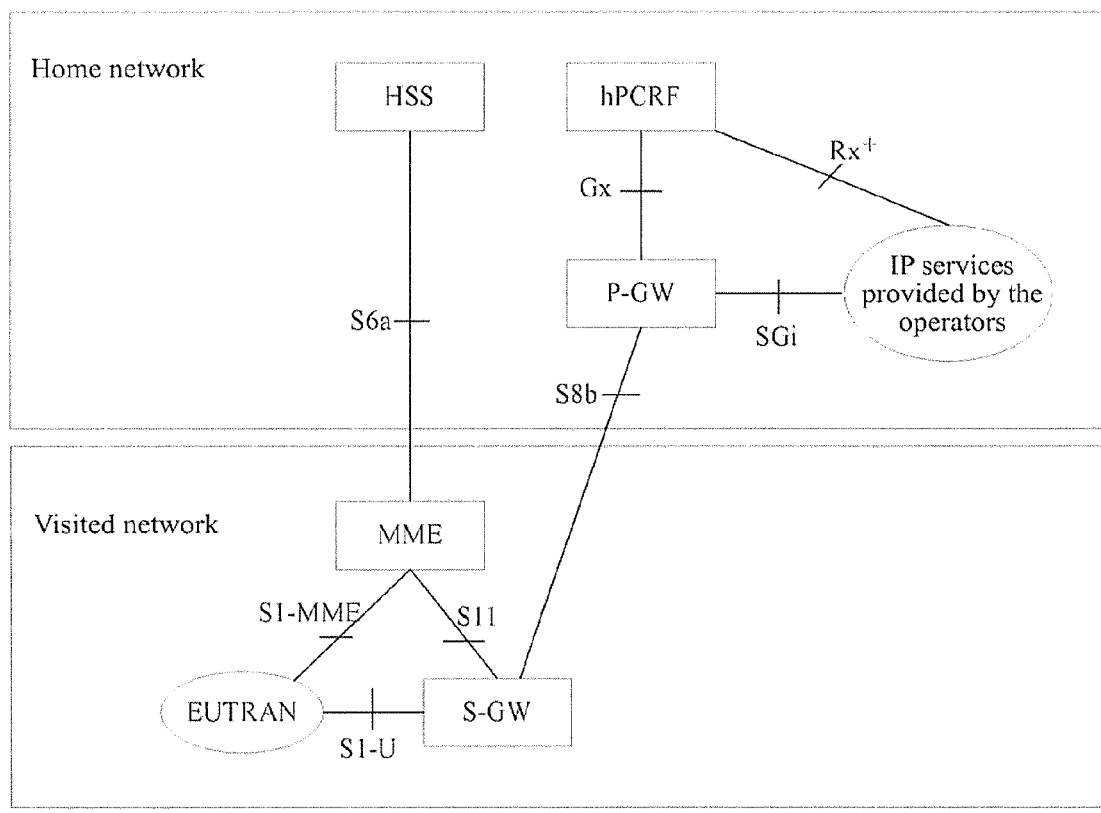
FIG. 6 is a schematic diagram of an application scene of the third embodiment of the present invention.

FIG. 6 is a schematic diagram of an application scene of the third embodiment of the present invention. In a roaming scene where a UE is home routing, the UE accesses the EPS through the E-UTRAN in a visited network using the PMIPv6 between an S-GW and a P-GW. The home network of the UE supports the dynamic PCC and the visited network does not support the dynamic PCC.

Figure 7:
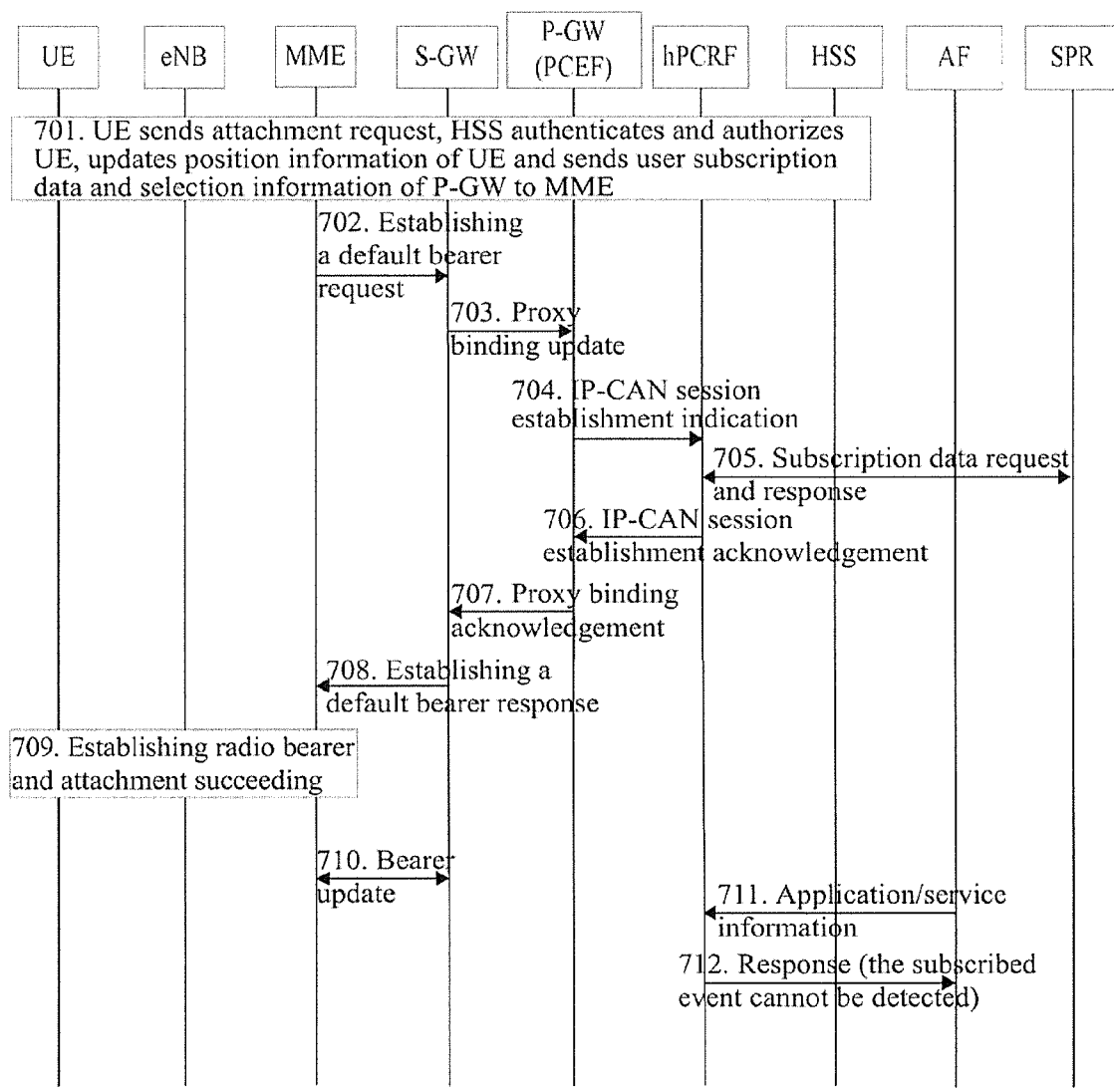
FIG. 7 is a flow chart of a method in accordance with the third embodiment of the present invention.

A flow chart of a method in accordance with the third embodiment of the present invention is shown in FIG. 7 and comprises specifically the following steps:

701: The UE sends a attachment request message to a MME; an a HSS authenticates and authorizes the UE, and upon successful authentication, the MME initiates a position update process and the HSS sends subscription data of the UE to the MME. During the authentication, the HSS sends P-GW selection information subscribed by the UE to the MME, which selects a P-GW according to the P-GW selection information and selects a S-GW as well.

702: After the MME selects the P-GW and the S-GW, it sends a default bearer establishment request to the selected S-GW.

703: After the P-GW receives the default bearer establishment request, it sends an proxy binding update message to the P-GW.

704: After the P-GW receives the binding update request message, it sends an IP-CAN session establishment indication, which contains a NAI of the UE, an IP address assigned by the P-GW for the UE, an APN and a MPT identifier used for indicating the PCRF that the UE accesses the EPS through the E-UTRAN using the PMIPv6 between the S-GW and the P-GW, to the PCRF in the home network of the UE (denoted by hPCRF), The MPT identifier can also notify the PCRF that the current access uses the non-GPRS tunneling protocol (GTP) by not containing a GTP specific parameter. If the message does not contain Default_EPS_Bearer_QoS, the PCRF may determine that the current access does not use the GTP.

705: The hPCRF interacts with a SPR to acquire subscription data associated with user access services.

706: Because the MPT indicates that the current access uses the PMIPv6 or other non-GTP, and the PCRF does not receive a gateway control session establishment indication message sent by the S-GW, the PCRF determines that the network where the S-GW is located does not support the dynamic PCC. In order to guarantee that the policy controls of the S-GW and the P-GW are consistent and the UE can be charged correctly, the PCRF decides not to start the dynamic PCC. The PCRF puts an indication that the dynamic PCC is not started into a message returned to the P-GW; or the PCRF can customize some special dynamic PCC rules for this specific scene, and these special dynamic PCC rules, however, must guarantee that the UE can be charged correctly.

707: After the P-GW receives the indication that the dynamic PCC is not stated, it uses preconfigured policy and charging rules or installs the special dynamitic PCC rules customized by the PCRF for this special scene; and the P-GW returns an proxy binding acknowledgement message to the trusted non-3GPP access gateway.

708: After the S-GW receives the proxy binding acknowledgement message, it returns a default bearer establishment response to the MME.

709: After the MME receives the default bearer establishment response, it initiates a radio bearer establishment message and notifies the UE that the attachment is successful.

710: After the MME notifies the UE that the attachment is successful, it initiates a bearer update message and sends radio bearer information to the S-GW.

711: The UE interacts with an AF, and after parameters, such as QoS, are negotiated for the access services, the AF sends an application/service information message to the PCRF to provide service information required for the access services.

712: The PCRF saves the service information and returns a response message containing an indication that a bearer layer event cannot be detected. The message may also contain a specific reason that the bearer layer event cannot be detected, that is, the network where the S-GW (i.e., the visited network of the UE) is located does not support the dynamic PPC (the current scene is the limited policy and charging control deployment scene), and the value of the reason may be called as a limited policy and charging control deployment indication identifier. After the AF receives the response message, it does not subscribe an AF signaling transmission path state notification, an IP-CAN type change notification and/or a resource assignment request successful or unsuccessful notification.

In addition, if the AF subscribes the AF signaling transmission path state notification, the IP-CAN type change notification and/or the resource assignment request successful or unsuccessful notification from the PCRF in step 711, the response message containing the indication that the bearer layer event cannot be detected is returned in step 712 and may contain the specific reason that the bearer layer event cannot be detected, and the AF cancels the subscription after receiving the message.

The PCRF can also determine that the network where the S-GW (i.e., the visited network of the UE) does not support the dynamic PCC using other methods. For example, the PCEF firstly determines that the visited network or the S-GW does not support the dynamic PCC according to the IP address of the S-GW and configuration information of the PCEF (which records IP addresses that correspond to the trusted non-3GPP access gateways supporting and/or not supporting the dynamic PCC) contained in the proxy binding update message such that the PCEF reports to the PCRF that the network where the S-GW (i.e., the visited network of the UE) does not support the dynamic PCC.

If the UE moves to a trusted non-3GPP access network supporting the dynamic PCC or a visited 3GPP access network or returns to its home network after the access through the embodiments described above, the PCRF detects that the trusted non-3GPP network or the visited 3GPP access network supports the dynamic PCC and sends a limited policy and charging deployment recovery indication (which is used for indicating that the current policy and charging deployment has been recovered from the limited policy and charging deployment to the normal policy and charging deployment) to the AF to notify the AF to subscribe the AF signaling transmission path state notification, the IP-CAN type change notification and/or the resource assignment request successful or unsuccessful notification. Afterwards, the AF can subscribe the bearer layer event again.

The Fourth Embodiment

Figure 8:
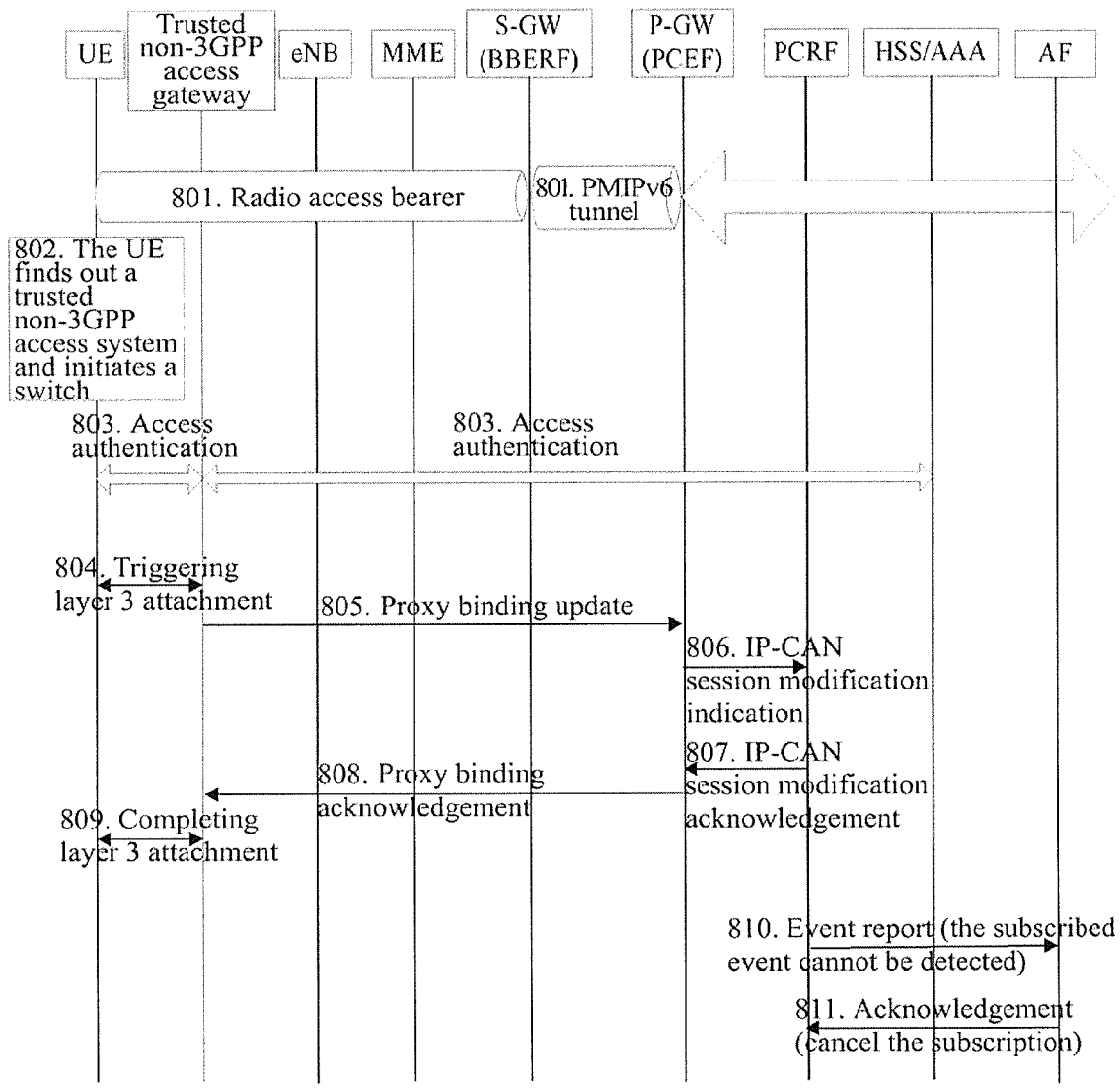
FIG. 8 is a flow chart of a method in accordance with the fourth embodiment of the present invention.

This embodiment illustrates a method for an AF to know the limited policy and charging control deployment in the process where a UE switches from E-UTRAN access to trusted non-3GPP access. Upon the access of the UE through the E-TRAN, the PMIPv6 is used between an S-GW and a P-GW, the 3GPP network supports the dynamic PCC and the trusted non-3GPP access gateway does not support the dynamic PCC, and the trusted non-3GPP network and the 3GPP network belong to different operators. Upon the access of the UE through the E-TRAN, the AF subscribes an AF signaling transmission path state notification, an IP-CAN type change notification and/or a resource assignment request successful or unsuccessful notification. As shown in FIG. 8, the method comprises the following steps:

801: A radio access bearer is established between the UE and the S-GW, a PMIPv6 tunnel is established between the S-GW and the P-GW, and the UE receives and sends data through the 3GPP network. QoS rules sent by a PCRF are installed in the S-GW and PCC rules sent by the PCRF are installed in the P-GW.

802: The UE finds out a trusted non-3GPP access system and initiates a switch.

803: The UE performs access authentication and authorization in the trusted non-3GPP access system; a 3GPP AAA server authenticates non-3GPP access of the UE, meanwhile, the HSS returns an address of the P-GW connected to the UE in the 3GPP system to the trusted non-3GPP access gateway.

804: A layer 3 attachment process of the UE is triggered.

805: The trusted non-3GPP access gateway sends an proxy binding update request to the P-GW.

806: The P-GW sends an IP-CAN session modification indication message, which contains a NAI of the UE, an IP address assigned by the P-GW for the UE, an APN and a MPT identifier used for indicating the PCRF that the access of the UE uses the PMIPv6, to the PCRF.

The MPT identifier can also notify the PCRF that the current access uses the non-GPRS tunneling protocol (GTP) by not containing a GTP specific parameter. If the message does not contain Default_EPS_Bearer_QoS, the PCRF may determine that the current access does not use the GTP.

807: Because the MPT indicates that the current access uses the PMIPv6 or other non-GTP, and the PCRF knows that the UE switches from the 3GPP network to the non-3GPP network, but the PCRF does not receive the gateway control session establishment indication message sent by the trusted non-3GPP access gateway, the PCRF determines that the trusted non-3GPP access gateway does not support the dynamic PCC. In order to guarantee that the policy controls of the trusted non-3GPP access gateway and the P-GW are consistent and the UE can be charged correctly, the PCRF decides not to start the dynamic PCC. The PCRF puts an indication that the dynamic PCC is not started into an IP-CAN session modification acknowledgement message returned to the P-GW; or the PCRF can customize some special dynamic PCC rules for this specific scene, and these special dynamic PCC rules, however, must guarantee that the UE can be charged correctly.

808: The P-GW deletes the PCC rules sent by the PCRF during the 3GPP access according to the indication that the dynamic PCC is not started, and uses preconfigured policy and charging rules, or updates the original PCC rules sent by the PCRF during the 3GPP access according to the special dynamic PCC rules customized by the PCRF for this particular scene, and returns an proxy binding acknowledgement message to the trusted non-3GPP access gateway.

809: The layer 3 attachment process is completed.

810: Because the AF subscribes the AF signaling transmission path state notification, the IP-CAN type change notification and/or the resource assignment request successful or unsuccessful notification when the UE accesses the EPS through the 3GPP, the trusted non-3GPP access network, however, does not support the dynamic PCC when the UE switches to the trusted non-3GPP access, such that the bearer layer event subscribed by the AF in the source network cannot be detected, therefore, the PCRF sends an event report message containing the indication that the bearer layer event cannot be detected to the AF. The message may also contain a specific reason that the bearer layer event cannot be detected, that is, the non-3GPP network does not support the dynamic PPC (the current scene is the limited policy and charging control deployment scene), and the value of the reason may be called as the limited policy and charging control deployment indication identifier.

811: After the AF receives the event report message, it returns an acknowledgement message and cancels the subscription.

The PCRF can also determine that the trusted non-3GPP network does not support the dynamic PCC using other methods. For example, the PCEF firstly determines that the trusted non-3GPP access gateway does not support the dynamic PCC according to the IP address of the trusted non-3GPP access gateway and configuration information of the PCEF contained in the proxy binding update message such that the PCEF reports to the PCRF that the trusted non-3GPP access gateway does not support the dynamic PCC.

If the UE moves to a trusted non-3GPP access network supporting the dynamic PCC or a visited 3GPP access network or returns to its home network after switching through the embodiments described above, the PCRF detects that the trusted non-3GPP network or the visited 3GPP access network supports the dynamic PCC and sends a limited policy and charging deployment recovery indication (which is used for indicating that the current policy and charging deployment has been recovered from the limited policy and charging deployment to the normal policy and charging deployment) to the AF to notify the AF to subscribe the AF signaling transmission path state notification, the IP-CAN type change notification and/or the resource assignment request successful or unsuccessful notification. Afterwards, the AF can subscribe the bearer layer event again.

A process where the UE switches from the 3GPP access to the trusted non-3GPP access, the GTP is used between the S-GW and the P-GW, and the 3GPP network supports the dynamic PCC and the non-3GPP network does not support the dynamic PCC is similar to the process described above.

In addition, a process where the UE switches inside the 3GPP, the source network supports the dynamic PCC and the target network does not support the dynamic PCC, and the PMIPv6 is used between the S-GW and the P-GW in the target network is similar to the process described above.

Accordingly, the process where the UE switches from the non-3GPP access network to the 3GPP network wherein the 3GPP access is a roaming method of the home routing, the PMIPv6 is used between the S-GW and the P-GW, and the home network supports the dynamic PCC and the visited network does not support the dynamic PCC can be implemented according to the idea of the present invention.

According to the basic principle of the present invention, many variations may be made to the above embodiment and some examples will be described below.

1. The PCRF may also determine whether the visited network supports the dynamic PCC based on the IP address of the trusted non-3GPP access gateway and the configuration information of the PCRF, and/or the care of address of the UE and the configuration information of the PCRF, and/or the IP address of the S-GW and the configuration information of the PCRF (that is, determine whether the current scene is the limited policy and charging control scene).

2. The PCRF may also notify the AF that the scene is the limited policy and charging control deployment scene by a corresponding response message after receiving an event subscription request sent by the AF.

In order to implement the method in the embodiment, the present invention also provides a policy and charging rules function (PCRF) which supports implementation of limited policy and charging control and is configured to determine whether a visited network where a user equipment (UE) roams supports the policy and charging control (PCC) and notify an application function (AF) that the subscribed event cannot be reported if the visited network does not support the PCC.

In addition, the PCRF is configured to send a message containing an identifier indicating the limited policy and charging control deployment to the AF such that the AF performs no subscription of the event and/or cancels the subscription of the event based on the identifier.

In addition, the PCRF is configured to determine whether the visited network supports the PCC by the following manner:

the PCRF determines whether the visited network supports the PCC after receiving an IP-connectivity access network (IP-CAN) session establishment indication message or an IP-CAN session modification indication message; when a mobility protocol type (MPT) identifier contained in the IP-CAN session establishment indication message or IP-CAN session modification indication message indicates that the access does not use a general packet radio service (GPRS)

tunneling protocol and the PCRF does not receive a gateway control session establishment indication message, it is determined that the visited network does not support the PCC.

In addition, the PCRF is configured to determine whether the visited network supports the PCC by the following manner:

the PCRF determines whether the visited network supports the PCC based on local configuration information as well as an IP address of an access gateway in the visited network and/or a care of address of the UE and/or an IP address of a service gateway.

In addition, the PCRF is configured to determine whether the visited network supports the PCC by the following manner:

a policy and control enforcement function (PCEF) determines whether the visited network supports the PCC based on local configuration information as well as an IP address of an access gateway in the visited network and/or a care of address of the UE and/or an IP address of a service gateway and notifies the PCRF of a determination result, and the PCEF determines whether the visited network supports the PCC based on the determination result.

In addition, the PCRF is configured to, after receiving an application/service information message or event subscription message sent by the AF, put the identifier indicating the limited policy and charging control deployment into a corresponding response message to send to the AF.

In addition, the PCRF is further configured to notify the AF that the subscribed event cannot be reported when the UE switches to an access gateway not supporting a bearer binding and event reporting function (BBERF).

In addition, the PCRF is further configured to send a limited policy and charging control deployment recovery indication identifier to the AF when detecting that the UE moves to a trusted non-3GPP access network supporting the PCC, a visited 3GPP access network or a home network.

Figure 9:
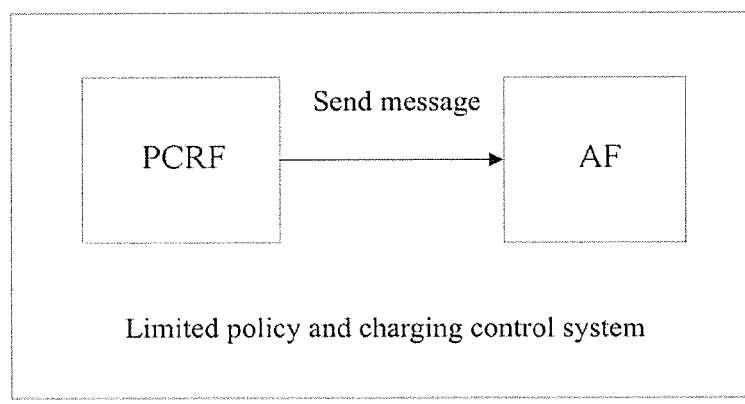
FIG. 9 is a block diagram of a system for implementing the limited policy and charging control in accordance with the present invention.

In order to implement the method of the embodiment, the present invention also provides a system for implementing the limited policy and charging control. As shown in FIG. 9, the system comprises the policy and charging function (PCRF) and application function (AF).

INDUSTRIAL APPLICABILITY

Using the method and system in accordance with the present invention, the AF can be notified more conveniently and accurately of the current policy and charging control deployment situation when the limited policy and charging control is implemented (i.e., when the visited network does not support the PCC). Moreover, the AF may perform the corresponding operations, such as inexecution of the subscription of the event or cancelation of the subscription of the event, according to the current policy and charging control deployment situation, thereby saving system resources.

What is claimed is:

1. A method for implementing limited policy and charging control comprising:
a policy and charging rules function (PCRF) device that determines whether a visited network where a user equipment (UE) roams supports policy and charging control (PCC), and notifying an application function (AF) of a limited policy and charging control deployment if the visited network does not support the PCC; and
when the PCRF device detects that the UE moves to a network supporting the PCC, the PCRF device then sending a limited policy and charging control deployment recovery indication identifier to the AF.

2. The method according to claim 1, further comprising:
after receiving the notification, the AF performing no subscription of the event and/or canceling the subscription of the event.

3. The method according to claim 1, wherein the notifying the AF comprises sending a message containing an identifier indicating the limited policy and charging control deployment to the AF; and
after receiving the message containing the identifier from the PCRF, the AF performs no subscription of the event and/or cancels the subscription of the event based on the identifier.

4. The method according to claim 1, wherein the PCRF determines whether the visited network supports the PCC by the following manner:
the PCRF determines whether the visited network supports the PCC after receiving an IP-connectivity access network (IP-CAN) session establishment indication message or an IP-CAN session modification indication message; when a mobility protocol type (MPT) identifier contained in the IP-CAN session establishment indication message or IP-CAN session modification indication message indicates that the access does not use a general packet radio service (GPRS) tunneling protocol and the PCRF does not receive a gateway control session establishment indication message, it is determined that the visited network does not support the PCC; or
the PCRF determines whether the visited network supports the PCC based on local configuration information as well as an IP address of an access gateway in the visited network and/or a care of address of the UE and/or an IP address of a service gateway; or
a policy and control enforcement function (PCEF) determines whether the visited network supports the PCC based on local configuration information as well as an IP address of an access gateway in the visited network and/or a care of address of the UE and/or an IP address of a service gateway and notifies the PCRF of a determination result, and the PCRF determines whether the visited network supports the PCC based on the determination result.

5. The method according to claim 1, wherein
after receiving an application/service information message or event subscription message sent by the AF, the PCRF puts an indication that the event cannot be reported into a corresponding response message to send to the AF.

6. The method according to claim 1, further comprising:
when the UE switches to an access gateway not supporting a bearer binding and event reporting function (BBERF), the PCRF notifying the AF that the subscribed event cannot be reported.

7. The method according to claim 1, wherein:
the network supporting the PCC is a trusted non-3GPP access network, a visited 3GPP access network or a home network.

8. The method according to any one of claim 2, wherein after receiving an application/service information message or event subscription message sent by the AF, the PCRF puts an indication that the event cannot be reported into a corresponding response message to send to the AF.

9. The method according to any one of claim 3, wherein after receiving an application/service information message or event subscription message sent by the AF, the PCRF puts an indication that the event cannot be reported into a corresponding response message to send to the AF.

10. The method according to any one of claim 4, wherein after receiving an application/service information message or event subscription message sent by the AF, the PCRF puts an indication that the event cannot be reported into a corresponding response message to send to the AF.

11. A policy and charging rules function (PCRF) device which supports implementation of limited policy and charging control, the PCRF device comprising:
   a processor configured to determine whether a visited network where a user equipment (UE) roams supports policy and charging control (PCC) and notify an application function (AF) of a limited policy and charging control deployment if the visited network does not support the PCC; and
   a communication unit configured to send a limited policy and charging control deployment recovery indication identifier to the AF when detecting that the UE moves to a network supporting the PCC.

12. The PCRF according to claim 11, wherein:
   the processor is configured to send a message containing an identifier indicating the limited policy and charging control deployment to the AF such that the AF performs no subscription of the event and/or cancels the subscription of the event based on the identifier.

13. The PCRF according to claim 11, wherein the processor is configured to determine whether the visited network supports the PCC by the following manner:
   the processor determines whether the visited network supports the PCC after receiving an IP-connectivity access network (IP-CAN) session establishment indication message or an IP-CAN session modification indication message; when a mobility protocol type (MPT) identifier contained in the IP-CAN session establishment indication message or IP-CAN session modification indication message indicates that the access does not use a general packet radio service (GPRS) tunneling protocol and the processor does not receive a gateway control session establishment indication message, it is determined that the visited network does not support the PCC; or
   the processor determines whether the visited network supports the PCC based on local configuration information as well as an IP address of an access gateway in the visited network and/or a care of address of the UE and/or an IP address of a service gateway; or
   a policy and control enforcement function (PCEF) determines whether the visited network supports the PCC based on local configuration information as well as an IP address of an access gateway in the visited network and/or a care of address of the UE and/or an IP address of a service gateway and notifies the processor of a determination result, and the processor determines whether the visited network supports the PCC based on the determination result.

14. The PCRF according to claim 11, wherein
   the processor is further configured to, after receiving an application/service information message or event subscription message sent by the AF, put the identifier indicating an indication that the event cannot be reported into a corresponding response message to send to the AF.

15. The PCRF according to claim 11, wherein
   the processor is further configured to notify the AF that the subscribed event cannot be reported when the UE switches to an access gateway not supporting a bearer binding and event reporting function (BBERF).

16. The PCRF according to claim 11, wherein
   the network supporting the PCC is a trusted non-3GPP access network, a visited 3GPP access network or a home network.

17. A system for implementing limited policy and charging control comprising the policy and charging rules function (PCRF) and application function (AF) of claim 11.

18. The PCRF according to any one of claim 12, wherein
   the PCRF is further configured to, after receiving an application/service information message or event subscription message sent by the AF, put the identifier indicating an indication that the event cannot be reported into a corresponding response message to send to the AF.

19. The PCRF according to any one of claim 13, wherein
   the PCRF is further configured to, after receiving an application/service information message or event subscription message sent by the AF, put the identifier indicating an indication that the event cannot be reported into a corresponding response message to send to the AF.

* * * * *